United States Patent [19]

Endoh et al.

[11] Patent Number: 5,780,380
[45] Date of Patent: Jul. 14, 1998

[54] PHOTOCATALYST COMPOSITION AND PROCESS FOR ITS PRODUCTION, AND PHOTOCATALYST COMPOSITION-ATTACHED SUBSTRATE

[75] Inventors: Eiji Endoh; Takeshi Morimoto, both of Yokohama, Japan

[73] Assignee: Asahi Glass Company Ltd., Tokyo, Japan

[21] Appl. No.: 770,731

[22] Filed: Dec. 19, 1996

[30] Foreign Application Priority Data

Dec. 21, 1995 [JP] Japan ................................. 7-333673

[51] Int. Cl.$^6$ ............................................... B01J 23/00
[52] U.S. Cl. ...................... 502/300; 502/313; 502/306; 502/309; 502/353; 502/354; 502/349; 502/350; 502/340; 502/341; 502/305
[58] Field of Search .................... 502/305, 313, 502/306, 309, 353, 354, 349, 350, 340, 341, 300

[56] References Cited

U.S. PATENT DOCUMENTS 5,616,532  4/1997  Heller et al. ........................... 502/242

FOREIGN PATENT DOCUMENTS 0 595 078  5/1994  European Pat. Off.
2 261 175  5/1993  United Kingdom.

OTHER PUBLICATIONS

Database WPI, Derwent Publications, AN 89-296646, JP-01 218 635, Aug. 31, 1989.

Database WPI, Derwent Publications, An 94-321431, JP-06 246 165, Sep. 6, 1994.

*Primary Examiner*—Walter D. Griffin
*Assistant Examiner*—Nadine Preisch
*Attorney, Agent, or Firm*—Oblon, Spivak, McClelland, maier & Neustadt, P.C.

[57] ABSTRACT

Semiconducting photocatalytic substance and fine oxide particles dispersed therein form a photocatalyst composition, with the photocatalyst composition having a band gap which is larger by at least 0.05 eV than the band gap of the semiconducting photocatalytic substance per se.

10 Claims, No Drawings

PHOTOCATALYST COMPOSITION AND PROCESS FOR ITS PRODUCTION, AND PHOTOCATALYST COMPOSITION-ATTACHED SUBSTRATE

The present invention relates to a photocatalyst composition which is capable of imparting a stain-decomposing property, an antifogging property, a deodorant property, a mildewproofing property and an antibacterial property to various substrate materials including glass and tiles and which is capable of effectively utilizing light energy such as sunlight, a process for its production and a photocatalyst composition-attached substrate.

As environmental problems have become distinctive, stain proofing and mildewproofing of indoor and outdoor building materials such as glass and tiles, are desired, as well as deodorization in the indoor space. In the prior art in this field, it has been proposed to form on a substrate surface a semiconducting photocatalytic substance such as $TiO_2$ by spray coating, dip coating, spin coating or sputtering to impart a stain-decomposing property, a deodorant property or a mildewproofing property (JP-A-6-278241).

However, the photocatalyst layer formed by such a conventional technique has not been fully satisfactory from the practical viewpoint, since the catalytic activity was inadequate, or the photocatalyst film strength was low, whereby the film was likely to be damaged or cracked.

Further, $TiO_2$ or the like has a high refractive index, and thus, when a transparent thin film thereof is formed on a transparent substrate such as glass, strong interference fringes are likely to appear to cause an ornamental problem.

Accordingly, it is an object of the present invention to provide a photocatalyst composition excellent in the photocatalytic activities and having the strength of the photocatalyst layer improved.

Another object of the present invention is to provide a photocatalyst composition which is free from strong interference fringes even when formed in a transparent thin film form on a transparent substrate such as glass.

The present invention provides a photocatalyst composition comprising a semiconducting photocatalytic substance and fine oxide particles dispersed in the semiconducting photocatalytic substance, said photocatalyst composition having a band gap which is larger by at least 0.05 eV than the band gap of the semiconducting photocatalytic substance per se.

Further, the present invention provides a process for producing a photocatalyst composition, which comprises coating on a substrate a coating liquid for forming a photocatalyst composition, comprising a material capable of forming a semiconducting photocatalytic substance and fine oxide particles dispersed in the material, to form a thin film, and then applying heat treatment thereto to obtain a photocatalyst composition having a band gap which is larger by at least 0.05 eV than the band gap of the semiconducting photocatalytic substance per se.

In general, when the band gap is large, the intensity of ultraviolet rays which are effectively used among the sunlight, decreases. However, the present invention provides a photocatalyst composition rich in the photoactivity even with a large band gap. Heretofore, a system comprising a semiconducting photocatalyst and an oxide, has already been known. For example, JP-A-8-164334 discloses a system having $TiO_2$ particles incorporated into the matrix of a $SiO_2$ sol, JP-A-8-228636 discloses a system having a photocatalyst supported on a $SiO_2$ carrier, JP-A-8-196903 discloses a system having the surface of a porous body of e.g. $SiO_2$ coated with $TiO_2$ having a uniform pore size, and JP-A-7-113272 discloses a system having $TiO_2$ particles blended to a moisture absorbent such as silica gel. However, in any one of these systems, no increase in the band gap takes place.

Now, the present invention will be described in further detail with reference to the preferred embodiments.

In the present invention, it is important that the band gap of the photocatalyst composition having fine oxide particles dispersed therein, is larger by at least 0.05 eV, preferably at least 0.1 eV, than the band gap of the semiconducting photocatalytic substance per se.

By the above construction, it is possible to obtain a photocatalyst composition having high strength and having stainproofing; antifogging, mildewproofing, deodorant and antibacterial properties superior to P-25 (fine $TiO_2$ powder manufactured by Nippon Aerozil K.K., band gap: about 3.2 eV) which has been so far believed to have the highest activities.

The semiconducting photocatalytic substance to be used in the present invention, is preferably an oxide semiconductor from the viewpoint of the chemical stability and photocatalytic activities, and it is preferably at least one member selected from the group consisting of $TiO_2$, $Bi_2O_3$, $In_2O_3$, $WO_3$, $ZnO$, $SrTiO_3$, $Fe_2O_3$ and $SnO_2$. From the viewpoint of the chemical stability and safety, $TiO_2$ is particularly preferred. As the material capable of forming the semiconducting photocatalytic substance, it is preferred to use a sol of the semiconducting photocatalytic substance or a precursor of the semiconducting photocatalytic substance (e.g. an organic metal complex).

Namely, to suppress the growth of crystals by heat treatment, it is preferred to use, as the starting material, the one having no definite crystal structure or the one having a very small crystal size.

The size of the starting material is preferably from 1 to 15 nm, more preferably from 1 to 10 nm. Further, the size of crystals of the semiconducting photocatalytic substance in the photocatalyst composition of the present invention, is preferably from 3 to 15 nm, more preferably from 5 to 15 nm.

The method for preparing the semiconducting photocatalytic substance is not particularly limited. For example, a heat decomposition method or a sol-gel method may be mentioned.

The fine oxide particles to be dispersed in the semiconducting photocatalytic substance, are preferably at least one member selected from the group consisting of $Al_2O_3$, $SiO_2$, $SnO_2$, $In_2O_3$ and $ZrO_2$.

The method for preparing the fine oxide particles is not particularly limited. For example, a heat decomposition method or a sol-gel method may be mentioned.

The shape of the fine oxide particles is preferably spherical, but may be various shapes such as a rod shape. The size of the fine oxide particles is not particularly limited. In a case where a transparent photocatalyst layer is to be formed, a size not to scatter light is required, and the average primary particle size is preferably from 1 to 200 nm, more preferably from 5 to 100 nm.

The dispersed proportion of the fine oxide particles is preferably from 20 to 80 vol %, more preferably from 30 to 70 vol %, to the total of the semiconducting photocatalytic substance (calculated as the oxide) and the fine oxide particles. Hereinafter, the dispersed proportion (vol %) of the fine oxide particles will be shown by the proportion calculated as described above.

If the dispersed amount of the fine oxide particles to the semiconducting photocatalytic substance is less than 30 vol %, particularly less than 20 vol %, the increase of the band gap of the photocatalyst composition tends to be small, whereby the photocatalytic activities tend to be no different from the band gap of the semiconducting photocatalytic substance per se, and the strength tends to be inadequate. On the other hand, if the dispersed amount of the fine oxide particles exceeds 70 vol %, particularly 80 vol %, the absolute amount of the semiconducting photocatalytic substance itself tends to be small, whereby the activities as the photocatalyst composition, tend to be low.

The method for dispersing the fine oxide particles into the semiconducting photocatalytic substance, is not particularly limited. However, it is preferred to disperse the fine oxide particles into the above-mentioned precursor or sol of the semiconductor photocatalyst, followed by baking.

As the coating method, spray coating, flexo printing, dip coating, screen printing or spin coating may, fore example, be employed.

By forming a thin film by coating, followed by heat treatment under a suitable condition, it is possible to form on a substrate a photocatalyst composition having the band gap increased.

With respect to the conditions for the heat treatment in the present invention, the temperature is preferably from 400° to 700° C., and the treating time is usually within a range of from 5 minutes to 2 hours. The temperature profile may suitable be selected.

The thickness of the thin film is practically preferably within a range of from 20 to 500 nm, since if the film thickness is thick, the strength tends to decrease although the photocatalytic activities will improve.

The substrate to be used in the present invention is not particularly limited, and it may, for example, be glass, ceramics, metal or other inorganic material. The surface of the substrate may be the surface of the base material itself, or the surface of a material different from the substrate itself, such as the surface of the treated surface layer of surface-treated glass (e.g. the surface provided with a sol-gel film, a sputtered film, a CVD film or a vapor deposition film). The shape of the substrate is not particularly limited and may be an optional shape depending upon the particular purpose, such as the one having a flat shape or the one having a curvature partially or over the entire surface.

In the present invention, the mechanism in which the photocatalytic activities are improved by dispersion of fine oxide particles into the semiconducting photocatalytic substance, is considered to be as follows.

In the process for producing the photocatalyst composition of the present invention, which comprises coating on a substrate a coating liquid for forming the photocatalyst composition, comprising a material capable of forming a semiconducting photocatalytic substance and fine oxide particles dispersed in the material, to form a thin film and then applying heat treatment thereto, the crystal growth of the oxide semiconductor during the heat treatment can be properly suppressed by properly selecting the heat treating conditions. Such suppressing effects are particularly remarkable when the proportion of the fine oxide particles dispersed into the semiconducting photocatalytic substance is in a proper range.

It has been found anew that as a result, crystals of the semiconducting photocatalytic substance in the photocatalyst composition of the present invention become smaller than crystals of a semiconducting photocatalytic substance formed by heat treatment of a sol of the semiconducting catalytic substance per se or the photocatalyst precursor (e.g. an organic metal complex) per se (i.e. without incorporating fine oxide particles).

This phenomenon means that degeneracy is partially removed by reduction of the size of semiconductor particles, and the band structure is changed, so that the band gap increases, i.e. the position of the valence band lowers. Electrochemically, this means that the oxidation-reduction potential of the valence band becomes positive, so that the oxidizing power increases. From the reaction theory, this means that the photocatalytic activities of the semiconductor will improve.

In the present invention, the mechanism of development of the antifogging property may be explained as follows. Namely, when the photocatalyst composition of the present invention is irradiated, holes will be formed in the valence band. These holes have a strong oxidizing power and will oxidize water molecules adsorbed on the photocatalyst surface, to form numerous OH radicals on the photocatalyst surface. The wettability of the surface is thereby improved to provide an antifogging property. Further, a stain on the surface will be decomposed and removed by the above-mentioned OH radicals having a very strong oxidizing power, whereby the wettability can be maintained for a long period of time.

In the present invention, the increase in the strength of the photocatalyst composition having fine oxide particles dispersed in the semiconducting photocatalytic substance, is believed to be attributable to the fact that the fine oxide particles serve as a filler.

Further, as mentioned above, during the heat treatment, the crystal growth of the oxide semiconductor is properly suppressed, and a firm bonding force will be formed between the fine oxide particles and fine crystals of the oxide semiconductor.

Now, the present invention will be described in further detail with reference to Examples. However, it should be understood that the present invention is by no means restricted to such specific Examples.

EXAMPLE 1

Spherical colloidal silica having an average primary particle size of 20 mm was dispersed in an aqueous solution of titanium oxide sol (6 wt % as $TiO_2$) so that the dispersed proportion would be 50 vol %. The dispersion thus obtained, was coated on a quartz glass substrate by spin coating and then subjected to heat treatment at 550° C. for 1 hour to form a photocatalyst composition in a film thickness of 200±20 nm. With respect to this sample, 1) the band gap, 2) the photocatalytic activity (constant for decomposing acetaldehyde), 3) the film strength (Taber abrasion test), 4) the antifogging property, 5) presence or absence of interference fringes, and 6) the size of crystals of the semiconducting photocatalytic substance in the photocatalyst composition, were evaluated as follows.

1) The transmittance of ultraviolet light through this sample was measured, whereby a sharp absorption was observed from 370 nm towards a short wavelength side. From this result, the band gap of this photocatalyst composition was found to be about 3.35 eV.

2) To evaluate the photocatalytic activity of this photocatalyst composition, the photo-decomposition reaction rate of acetaldehyde as the main component for the bad odor of tobacco, was evaluated. The test was carried out in such a manner that a sample of 5 cm×5 cm was put into a 3 l angular reaction tube made of quartz, and acetaldehyde vapor was introduced into the reaction tube. Then, black light was irradiated to the sample from the exterior so that the irradiation intensity of ultraviolet rays (365 nm) at the sample surface was 1.8 mW/cm², whereby the decrease of acetaldehyde was measured by gas chromatograph, and constant for decomposition of acetaldehyde was determined.

From the change with time of the decrease of acetaldehyde, the photo decomposition reaction was considered to be a zero order reaction, and constant k was calculated. As a result, constant k was $4.0 \times 10^{-4}$ mmol/ (l·hr·cm$^2$).

3) The film strength of the photocatalyst composition was evaluated by a Taber abrasion test. The load was 500 g. and the test was carried out 1,000 times, whereby no substantial abrasion was observed.

4) With respect to the obtained sample, the antifogging property was evaluated in terms of the initial antifogging property and the antifogging durability in accordance with the following methods. Namely, for the initial antifogging property, a breath was applied to the sample, and the time until the fogging completely disappeared, was measured. The test was repeated 3 times, and the average time was examined, whereby no fogging was observed. For the antifogging durability, the sample was immersed in warm water of 60° C. for 3 days, and then the average time until the fogging completely disappeared, was examined in the same manner as for the initial fogging property. As a result, no fogging was observed.

5) With respect to the obtained sample, presence or absence of interference fringes was inspected, whereby the transparency was very high and no interference fringes were observed.

6) The crystal size of the semiconducting photocatalytic substance in the photocatalyst composition was measured by the X-ray diffraction (XRD) analysis, whereby it was found to be 11 nm.

EXAMPLE 2

A sample was prepared and evaluated in the same manner as in Example 1 except that instead of the colloidal silica used in Example 1, a rod-shaped colloidal alumina having an average primary particle size of 10 nm and an average primary particle length of 100 nm, was dispersed so that it would be 50 vol %.

EXAMPLE 3

Using a toluene solution of |CH$_3$(CH$_2$)$_3$CH(C$_2$H$_5$)COO|$_4$Ti (titanium 2-ethylhexanoate) (5 wt % as TiO$_2$), as a titanium oxide precursor, colloidal silica having an average primary particle size of 11 nm dispersed in ethanol, was added so that it would be 40 vol %, to obtain a dispersion. The dispersion was coated on a quartz glass substrate by spin coating and then subjected to heat treatment at 550° C. for 1 hour to form a thin film of a photocatalyst composition. With respect to the obtained sample, evaluation was carried out in the same manner as in Example 1.

EXAMPLE 4

A sample was prepared and evaluated in the same manner as in Example 3 except that 40 vol % of colloidal silica in Example 3, was changed to 85 vol %.

EXAMPLE 5

A sample was prepared and evaluated in the same manner as in Example 3 except that instead of the colloidal silica in Example 3, zirconia powder having an average particle size of 20 nm was added so that it would be 40 vol %.

EXAMPLE 6

A sample was prepared and evaluated in the same manner as in Example 1 except that instead of the colloidal silica in Example 1, a water-soluble SnO$_2$ sol was dispersed so that it would be 45 vol %.

EXAMPLE 7

A sample was prepared and evaluated in the same manner as in Example 1 except that instead of the colloidal silica in Example 1, fine In$_2$O$_3$ powder having an average primary particle size of 20 nm was dispersed so that it would be 60 vol %.

EXAMPLE 8 (COMPARATIVE EXAMPLE)

A sample was prepared and evaluated in the same manner as in Example 1 except that in Example 1, no colloidal silica was incorporated.

With respect to the sample obtained in Example 8, the transmittance of ultraviolet light was measured, whereby a sharp absorption was observed from 393 nm towards a short wavelength side, whereby the band gap of this photocatalyst was found to be about 3.16 eV.

Further, in Example 8, as a result of the Taber abrasion test, abrasion of the film was substantial after repeating the test 1,000 times, whereby the substrate was almost exposed, and the TiO$_2$ layer formed on the quartz glass substrate had strong interference fringes due to the high refractive index of TiO$_2$.

The results of evaluation of the samples of Examples 1 to 8 are summarized in Table 1. The unit for the band gap in Table 1 is eV, and the unit for constant (constant for decomposition of acetaldehyde) is mmol/(l·1 hr·cm$^2$). The film strength represents the degree of abrasion, and the unit for the initial antifogging property and the antifogging durability is seconds (the average time until the fogging completely disappeared). No fogging is represented by (—). The interference fringes were evaluated as to presence or absence, and a case where transparency was high and no interference fringes were observed, is indicated by "absence". The crystal size is meant for the crystal size of the semiconducting photocatalytic substance in the photocatalyst composition.

TABLE 1

| Example No. | Band gap | Constant | Film strength | Initial antifogging property | Antifogging durability | Interference fringes | Crystal size (nm) |
| --- | --- | --- | --- | --- | --- | --- | --- |
| 1 | 3.35 | $4.0 \times 10^{-4}$ | No substantial abrasion | — | — | Absence | 11 |
| 2 | 3.30 | $3.4 \times 10^{-4}$ | No substantial abrasion | — | — | Absence | 12 |
| 3 | 3.32 | $3.7 \times 10^{-4}$ | No substantial abrasion | — | — | Absence | 11.5 |

TABLE 1-continued

| Example No. | Band gap | Constant | Film strength | Initial antifogging property | Antifogging durability | Interference fringes | Crystal size (nm) |
|---|---|---|---|---|---|---|---|
| 4 | 3.37 | $1.5 \times 10^{-4}$ | No substantial abrasion | 5.0 | 4.2 | Absence | 10 |
| 5 | 3.37 | $4.2 \times 10^{-4}$ | No substantial abrasion | — | 2.4 | Absence | 10 |
| 6 | 3.30 | $4.0 \times 10^{-4}$ | No substantial abrasion | — | 1.2 | Absence | 12 |
| 7 | 3.33 | $3.5 \times 10^{-4}$ | No substantial abrasion | — | — | Absence | 11.5 |
| 8 | 3.16 | $1.0 \times 10^{-4}$ | Substantial abrasion | 6.8 | 12.1 | Presence | 20 |

As described in the foregoing, the photocatalyst composition of the present invention is excellent in the photocatalytic activity and has excellent film strength. Further, the present invention provides a photocatalyst composition which is free from interference fringes even when formed in a transparent thin film shape on a transparent substrate such as glass.

What is claimed is:

1. A photocatalyst composition comprising a semiconducting photocatalytic substance and fine oxide particles dispersed in the semiconducting photocatalytic substance, said photocatalyst composition having a band gap which is larger by at least 0.05 eV than the band gap of the semiconducting photocatalytic substance per se.

2. The photocatalyst composition according to claim 1, wherein the semiconducting photocatalytic substance is at least one member selected from the group consisting of $TiO_2$, $Bi_2O_3$, $In_2O_3$, $WO_3$, $ZnO$, $SrTiO_3$, $Fe_2O_3$ and $SnO_2$.

3. The photocatalyst composition according to claim 1, wherein the fine oxide particles are at least one member selected from the group consisting of $Al_2O_3$, $SiO_2$, $SnO_2$, $In_2O_3$ and $ZrO_2$.

4. The photocatalyst composition according to claim 1, wherein the dispersed proportion of the fine oxide particles is from 20 to 80 vol % to the total of the semiconducting photocatalytic substance and the fine oxide particles.

5. A process for producing a photocatalyst composition, which comprises coating on a substrate a coating liquid for forming a photocatalyst composition, comprising a material capable of forming a semiconducting photocatalytic substance and fine oxide particles dispersed in the material, to form a thin film, and then applying heat treatment thereto to obtain a photocatalyst composition having a band gap which is larger by at least 0.05 eV than the band gap of the semiconducting photocatalytic substance per se.

6. The process for producing a photocatalyst composition according to claim 5, wherein the material capable of forming a semiconducting photocatalytic substance comprises a sol of the semiconducting photocatalytic substance or a precursor of the photocatalytic substance.

7. A photocatalyst composition-attached substrate comprising a substrate and a photocatalyst composition formed on the substrate, wherein the photocatalyst composition comprises a semiconducting photocatalytic substance and fine oxide particles dispersed in the semiconducting photocatalytic substance, and the photocatalyst composition has a band gap which is larger by at least 0.05 eV than the band gap of the semiconducting photocatalytic substance per se.

8. The photocatalyst composition-attached substrate according to claim 7, wherein the semiconducting photocatalytic substance is at least one member selected from the group consisting of $TiO_2$, $Bi_2O_3$, $In_2O_3$, $WO_3$, $ZnO$, $SrTiO_3$, $Fe_2O_3$ and $SnO_2$.

9. The photocatalyst composition-attached substrate according to claim 7, wherein the fine oxide particles are at least one member selected from the group consisting of $Al_2O_3$, $SiO_2$, $SnO_2$, $In_2O_3$ and $ZrO_2$.

10. The photocatalyst composition-attached substrate according to claim 7, wherein the dispersed proportion of the fine oxide particles is from 20 to 80 vol % to the total of the semiconducting photocatalytic substance and the fine oxide particles.

* * * * *